Figure 7:
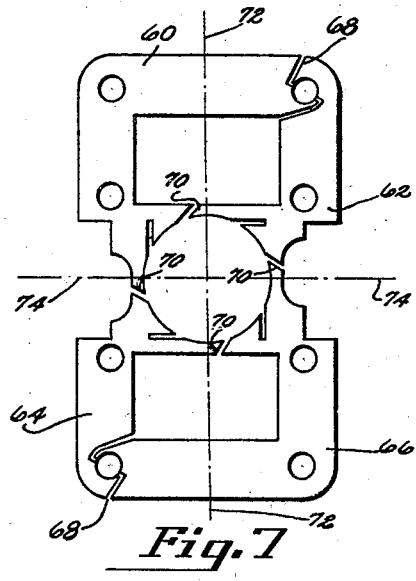

July 14, 1936.    W. J. O'LEARY    2,047,487
ELECTRIC MOTOR
Filed Feb. 19, 1934    2 Sheets-Sheet 1
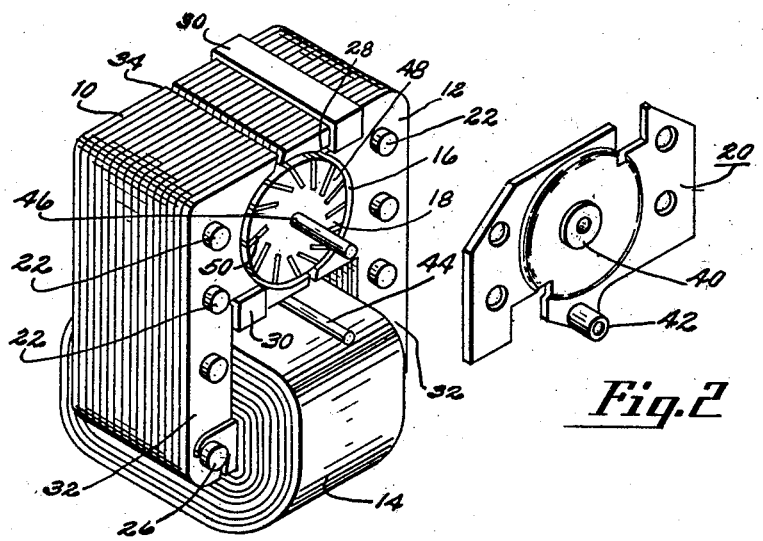
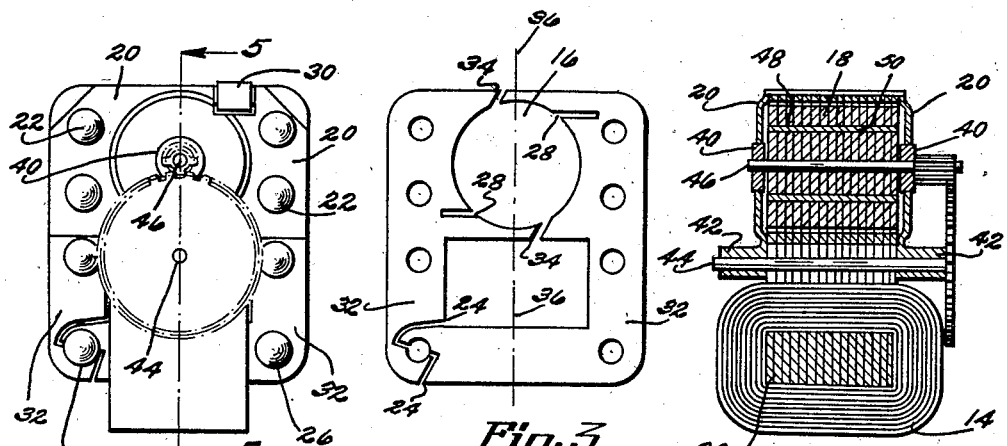
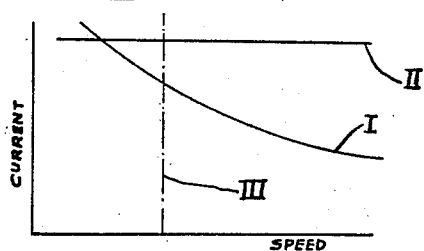
INVENTOR
William J O'Leary
BY Walker and Delring
ATTORNEY July 14, 1936.                 W. J. O'LEARY                 2,047,487
                                ELECTRIC MOTOR
                          Filed Feb. 19, 1934              2 Sheets-Sheet 2

Patented July 14, 1936

2,047,487

UNITED STATES PATENT OFFICE 2,047,487

ELECTRIC MOTOR

William J. O'Leary, Dayton, Ohio

Application February 19, 1934, Serial No. 711,967

16 Claims. (Cl. 172—278)

This invention relates to electric motors and particularly to an induction motor of the transformer type, having shading rings to supply starting torque.

The use of shading rings enclosing a portion of the poles of an induction motor is per se old. The proportion of the pole faces enclosed by the shading rings has varied greatly in the prior art as has also the relative extent of the shaded and unshaded poles about the rotor and the consequent distribution of shaded and unshaded flux seemingly without much knowledge of the results. I have found that the relative size of the shading rings and proportion of the pole faces included therein is critical and that a relative small increase or decrease of shading ring dimensions and change of position relative to the pole face has a very marked effect upon the motor efficiency. Likewise the relative extension of the shaded and unshaded portions of the poles about the rotor is important. The extension of the shaded portion of the poles beyond the plane of symmetry of the motor produces a beneficial effect. The effectiveness of these characteristics embodied in the present motor is further augmented by disposing the bars of a squirrel cage rotor in a substantially overlapping relation where they exert a baffling effect upon the lines of force within the rotor and thereby induce a greater rotative influence.

An object of the invention is to improve the characteristics and construction of shading ring induction motors whereby they will not only be cheap in construction, but will possess maximum efficiency, uniformity of action, be capable of being economically manufactured and unlikely to get out of repair.

Another object of this invention is to provide a motor wherein the power input decreases as the load decreases and vice versa.

Another object of this invention is to provide a motor which is simple, efficient, and easily constructed without sacrificing quality.

Another object of the present invention is to properly proportion the shading ring and the stator to achieve the greatest efficiency.

A further object of the invention is the extension of the shaded pole of the motor beyond the plane of symmetry thereof which it has been discovered is also beneficial in increasing the efficiency.

A further object of the invention is to effect distribution to the rotor of shaded and unshaded flux throughout substantially equal peripheral extent, that is making each shaded and unshaded face effective over approximately one fourth of the peripheral area of the rotor.

A further object of the invention is to provide an improved form of stator and pole faces.

A further object of the invention is to provide a sectional stator having interlocking means for the respective sections.

A further object of the invention is to provide an improved form of squirrel cage rotor.

A further object of the invention is to provide a squirrel cage rotor having its bars so disposed as to deflect the lines of force therethrough to increase the rotative influence thereof.

A further object of this invention is to provide a shading ring motor of the transformer type wherein the shading ring encloses a very small portion of metal compared to the area of the shaded pole face. This has been accomplished by extending the shaded pole tip beyond the plane of symmetry of the motor.

Another object of this invention is to provide a rotor having the maximum starting efficiency for a shading ring transformer type motor by arranging the rotor bars at an acute angle with respect to radial planes of the rotor.

A further object of the invention is to provide a motor possessing the advantageous operating characteristics and features of construction hereinafter described.

Another object of this invention is to provide a synchronous motor that is self-starting.

With the above primary and other incidental objects in view, as will more fully appear in the specification, the invention consists of the features of construction, the parts and combinations thereof, and the mode of operation, or their equivalents, as hereinafter described and set forth in the claims.

Figure 6:
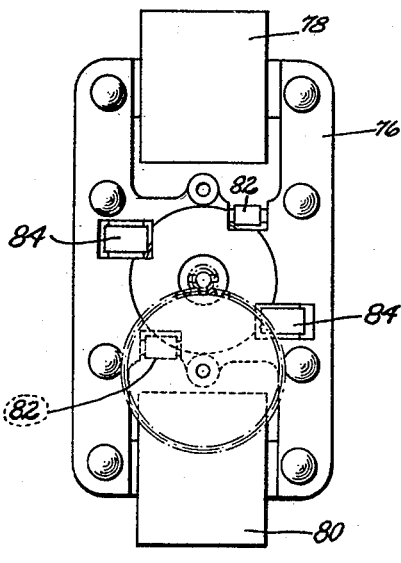
Figure 9:
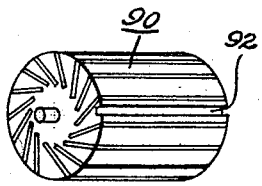

Fig. 1 is a perspective view of a two pole motor with the end frames or bearing plates removed. Fig. 2 is a perspective view of the end frame or bearing plate. Fig. 4 is a front elevation. Fig. 5 is a vertical sectional view. Fig. 3 is a detail view of a stator plate. Fig. 6 is a front elevational view of a four pole motor embodying the invention. Fig. 7 is a front view of a stator plate therefor. Fig. 8 discloses a curve obtained from the characteristics of the motor. Fig. 9 discloses another modification of the rotor.

In the drawings, the reference numerals 10 and 12 indicate a pair of laminations that cooperate to form the magnetic core of a transformer type induction motor. An energizing winding 14 links the core, which is provided with a cylindrical recess 16 that carries a rotor 18 journaled in the end frame 20, held in position by rivets 22 passing through the laminations.

As may best be seen from Fig. 3, the laminations are cut along a substantially Z-shaped line at 24 which interlocks with rivets 26 to hold the laminations in a relatively fixed relation. The laminations may, if desirable, be made so as to stagger the lines of severance, thereby improving the magnetic path. Slots 28 in the laminations, extending from the cylindrical opening 16, provide seats for the shading rings 30. It has been found that by positioning the slots 28 so that the shading rings 30 will enclose an area substantially equal to one-third of the cross sectional area of the legs 32, the maximum torque with respect to the most desirable operating efficiency under normal load conditions may be obtained with the use of proper shading rings. As the area enclosed by the shading rings is very small it has been found necessary in order to produce the proper starting torque to extend the shaded pole tips to a point 34 which lies beyond the plane of symmetry, indicated by the line 36 in Fig. 3. The air gap 34 increases the reluctance of the magnetic path, whereby the flux linking the ring 30 is reduced to the desired quantity or flux density. This may, of course, be varied by changing the size of the air gap. The position of the slots 34 beyond the plane of symmetry, indicated by the dotted line 36, determines the area of the pole supplying shaded flux to the rotor. It has been found that the position of the slots 34 may be varied considerably without greatly influencing the operation of the motor provided the slots 34 lie beyond the plane of symmetry. If the slot 34 is located intermediate the shaded pole or the shading rings and the plane of symmetry, the efficiency is greatly reduced. A scientific explanation of this is not deemed to be required, suffice to state that it has been found to operate as described. A motor having the shaded pole area equal to approximately one-third of the area of the entire pole area has been found to give very satisfactory results.

For a motor having a one-inch rotor it has been found desirable to have the slot 28 spaced three-sixteenths of an inch from the edge of the laminations and the entrance of slot to the aperture for receiving the rotor nine thirty-seconds of an inch from the mechanical neutral of the laminations. It has been found that greater efficiency is obtained when the air gap 34 is located intermediate the unshaded pole and the mechanical neutral plane. By such a structure there is a considerable difference between the power required on no-load operating conditions and the power required at full-load operating conditions. In some motors the power input at no load is only 50% of the power input at full load which is no greater than the average power input at full load of motors now on the market and probably considerably less as the instant motor at full load has a greater efficiency than other shading ring motors of the core type.

The end frame 20 completely encloses the rotor 18 when in position. In addition to the bearing 40 in which the rotor shaft is journaled, the end frame has been provided with a second bearing 42 through which passes a shaft 44 which may be suitably geared to the rotor shaft. The shaft 44 may be used to drive any suitable mechanism and is substantially concentric with respect to the motor structure so that if the motor is used for propelling a fan, a mixer, or any other small device it is not necessary to drive directly but indirectly from the offset shaft.

The rotor 18 is made up of laminations attached to the shaft 46, each lamination being provided with inclined slots 48. In each slot 48 there is found the rotor bars 50 which are flat and placed at an incline with respect to the radial planes of the rotor. It has been found that a rotor constructed with the slots inclined and the bars therein inclined has a greater starting torque than a rotor wherein the induction bars are located in conventional slots.

In Fig. 8 the speed of the rotor has been plotted as abscissas and the current input for a given voltage supplied to the terminals has been plotted as ordinates. As is well known, the speed of induction motors decreases with an increase of load. With this in mind it can readily be seen that the current input increases as the load increases, or the speed decreases as shown by curve I, a curve taken of a motor constructed according to this invention. For comparison curve II shows the current plotted against speed of a shading ring core type motor now on the market. It is to be noted the current input in this motor is greater throughout the entire range of speed excepting for an extremely large load, i. e. an extremely low speed. As indicated by the dot-dash line III indicating normal load, the current input shown by curve I is far less than the current input shown by curve II. When the motor is operating at less than full load, as is the case in numerous instances, the current in the instant motor is far less than the current input for a like motor now found on the market producing substantially the same characteristic, as shown by curve II.

A four-pole motor embodying the invention has been disclosed in Figs. 6 and 7, the motor assembly being shown in Fig. 6 and a set of laminations in Fig. 7. The laminations are made up of four parts, 60, 62, 64, and 66; members 60 and 62 being joined along a zigzag line 68 and members 64 and 66 along another zigzag line 68. In this modification each pole piece includes about ¼ of the rotor, the shaded pole area enclosing approximately half of the pole piece. Again it is seen that the shaded pole tips 70 extend beyond the mechanical neutral planes 72 and 74 and the operation of the motor is very similar to the modification disclosed in Figs. 1–5 inclusive, excepting that four poles surround the rotor instead of two and the power increased.

The stator assembly is held in position by suitable end frames 76 provided with suitable gaps for receiving a pair of windings 78 and 80. By referring to Fig. 6 it is seen that the shading rings 82 diametrically arranged are smaller than the shading rings 84. In other words the longitudinal flux path is not identical to the transverse flux path. The curves obtainable from the motor disclosed in Figs. 6 and 7 are quite similar to the curve of the motor disclosed in Figs. 1–5. For convenience the motor disclosed in Figs. 6 and 7 has been designated as a compound core type motor.

Referring to Fig. 9, the rotor 90 is provided with an open notch or slot 92 which probably causes the rotor to become polarized. It has been found that when the rotor is provided with one notch 92 the motor will start as an induction motor and operate as a synchronous motor. Without prejudice, the mode of operation may possibly be described as follows:—The rotor probably has a pair of diametrically arranged poles intermediate one side of which is found a notch 92 which causes the rotor to rotate in synchronism when up to speed, the other side of the rotor intermediate the pole pieces functioning as a squirrel cage rotor to cause it to start with a fairly strong torque.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. An electric motor of the shading ring induction type including a rotor, a stator substantially rectangular in shape having an energizing winding linking one leg and an opening in another leg forming a pair of pole pieces facing the rotor upon opposite sides of the mechanical neutral plane, each of the pole pieces having a shaded extension extending beyond the mechanical neutral plane toward the unshaded pole tip of the adjacent pole and separated therefrom with an air gap, said unshaded pole tip being spaced from the mechanical neutral, so that shaded flux enters the rotor beyond the mechanical neutral plane.

2. In an electric motor of the shading ring type, a pole piece having at least one straight side, said pole piece facing a rotor and having the entire shaded pole tip extending beyond a plane normal to said straight side and coincident with the axis of the rotor, so that the thickness of the pole tip is greater at its tip than at the intersection of said plane, and a shading ring for shading the flux passing from said pole tip into the rotor.

3. In an electric motor, a stator including a plurality of stacked laminations joined along a zig-zag line intersecting a retaining member, one end of the laminations being arranged in hooked relation with respect to said retaining member, so that the laminations are held in position thereby.

4. A bi-polar shading ring induction motor of the transformer type, including pole pieces substantially enclosing the rotor, the pole pieces having slots therein, shading rings located in said slots, said slots being so positioned that the shaded pole area is substantially equal to one-half of the unshaded pole area, and pole extensions integral with the pole pieces extending the shaded pole pieces beyond the plane of symmetry whereby shaded flux enters the rotor beyond the plane of symmetry, said extension being separated from the unshaded pole tip.

5. In an electric motor, a stator including a plurality of stacked laminations joined along a zig-zag line intersecting an annular retaining member one end of the laminations being arranged in hooked relation with respect to said annular retaining member so that the laminations are held in position thereby.

6. In an electric motor, a stator including a pair of complementary laminations terminating in pole pieces surrounding the rotor, each of said laminae including a slot for receiving a shading ring, said slot dividing the pole piece into a shaded and an unshaded pole area, the shaded pole area extending beyond the median plane toward the unshaded pole area of the adjacent pole piece but separated therefrom.

7. A bi-polar shading ring induction motor of the transformer type, including pole pieces substantially enclosing a rotor, the pole pieces having slots therein, shading rings located in said slots, said slots being so positioned that the distance of the slot from the edge of the lamination is three times the distance from the opening of the slot to the medial plane, said shaded portion of the pole piece extending beyond the plane of symmetry so as to supply shaded flux between the plane of symmetry and the adjacent pole, said shaded portion being separated from the adjacent pole tip.

8. A shading ring induction motor of the core type including a plurality of pole pieces substantially enclosing the rotor, the pole pieces having slots therein, shading rings located in said slots, the shaded portion of the pole pieces extending beyond the plane of symmetry so as to supply shaded flux between the plane of symmetry and the adjacent pole, said shaded portion being separated from the adjacent unshaded pole tip.

9. A four-pole shading ring induction motor of the transformer type including pole pieces substantially enclosing the rotor, shading rings on each of the pole pieces for supplying a shaded flux to the rotor, said shading rings being arranged transversely and longitudinally with respect to said stator, the longitudinal shading rings being larger than the transverse shading rings.

10. A shaded pole electric motor, the area of the shaded portion of each pole face being approximately one-half of the area of the unshaded pole face and the area of the shaded portion of each pole being approximately one-eighth of the area of the unshaded portion of such pole in a direction perpendicular to the lines of force, the several shaded poles having magnetic bridges between them of approximately one-half of the area of the pole enclosed by the shading coil, the shading rings having a resistance of from one-half to one-tenth of an ohm, multiplied by the length of the rotor divided by the air gap in inches.

11. A shading ring induction motor including a rotor, a stator having a plurality of pole pieces substantially enclosing the rotor, the pole pieces having slots therein, shading rings located in said slots, the shaded portion of the pole pieces extending beyond the mechanical neutral plane so as to supply shaded flux between the neutral plane and the adjacent pole, said rotor including laminae having a plurality of peripheral slots inclined with respect to the radius of the rotor and conductor bars located in said slots, the outer periphery of the conductor bars intersecting the flux path prior to the inner edge thereof, thereby functioning as baffles influencing the reluctance of the magnetic path.

12. An electric motor of the shading ring induction type including a rotor, a stator substantially rectangular in shape having an energizing winding linking one leg and an opening in another leg forming a pair of pole pieces facing the rotor upon opposite sides of the mechanical neutral plane, each of the pole pieces having a shaded extension extending beyond the mechanical neutral plane toward the unshaded pole tip of the adjacent pole, said unshaded pole tip being spaced from the mechanical neutral so that the shaded flux enters the rotor beyond the mechanical neutral plane, said rotor having a plurality of peripheral slots inclined with respect to the radius of the rotor and connector bars located in said slots, the outer peripheral edge of said bars intersecting the flux path sooner than the inner edge thereof causing the speed of rotation of the rotor to approach synchronism.

13. A shading ring induction motor having a substantially rectangular stator having windings upon opposite ends thereof, a pair of magnetic bridges arranged in parallel with said ends and cooperating with the sides of the rectangular stator to inclose the rotor, the sides and bridges having shading rings linking the same, the shading rings linking the sides being larger than the shading rings linking the bridges.

14. A shading ring induction motor having a substantially rectangular stator having windings linking opposite ends thereof, magnetic bridges spanning the sides and cooperating therewith to inclose the rotor, shading rings linking the sides and bridges, the shading rings linking the sides varying in size from those linking the bridges.

15. A shading ring induction type motor having a rotor including a circuituous flux path, exciting windings linking opposite portions of said flux path, magnetic bridges spanning said flux path and arranged in parallel with portions linked by the windings, said bridges cooperating with other portions of said flux path to supply flux to the rotor, and shading rings linking the bridges and other shading rings linking said other portions of said first mentioned flux path, the shading rings linking the bridges differing in size from said other shading rings.

16. A stator for an induction type shading ring motor having a rotor, including laminations forming a circuituous magnetic path, opposite portions of which are linked by exciting windings, magnetic bridges spanning other portions of said path, said bridges and other portions cooperating to inclose the rotor and supply magnetic flux thereto, shading rings upon said other portions for supplying shaded flux to the rotor, and smaller shading rings upon said bridges for also supplying shaded flux to the rotor.

WILLIAM J. O'LEARY.